US007672907B2

(12) United States Patent
Morel

(10) Patent No.: US 7,672,907 B2
(45) Date of Patent: Mar. 2, 2010

(54) POSTAGE METER HAVING A VERTICAL PATH

(75) Inventor: Bruno Morel, Jouy-en-Josas (FR)

(73) Assignee: NEOPOST Technologies, Bagneux (FR)

( * ) Notice: Subject to any disclaimer, the term of this patent is extended or adjusted under 35 U.S.C. 154(b) by 400 days.

(21) Appl. No.: 11/625,488

(22) Filed: Jan. 22, 2007

(65) Prior Publication Data

US 2007/0174215 A1 Jul. 26, 2007

(30) Foreign Application Priority Data

Jan. 23, 2006 (FR) .................................. 06 50221

(51) Int. Cl.
*G06F 17/00* (2006.01)

(52) U.S. Cl. ...................................................... 705/401

(58) Field of Classification Search ....................... None
See application file for complete search history.

(56) References Cited

U.S. PATENT DOCUMENTS 3,866,235 A * 2/1975 Maynard et al. .............. 346/22
4,872,119 A * 10/1989 Kajimoto .................... 705/402
4,892,162 A 1/1990 Dolan
4,893,249 A 1/1990 Silverberg
5,649,275 A * 7/1997 Kaneta ....................... 399/381
5,969,735 A * 10/1999 Haigo ......................... 347/85
6,438,529 B1 * 8/2002 Thiel ........................... 705/62

FOREIGN PATENT DOCUMENTS

DE 299 11 764 U1 3/2000

OTHER PUBLICATIONS

"Section 7: Binding and Finishing", Printing Impressions, v40, n2, p. 220(1), Jul. 1997.*

* cited by examiner

*Primary Examiner*—John W Hayes
*Assistant Examiner*—Rob Wu
(74) *Attorney, Agent, or Firm*—Sughrue Mion, PLLC

(57) ABSTRACT

In a postage meter including a print module for printing on mail items, a feed tray for feeding in mail items to said print module, and a collection tray for receiving the mail items once they have been franked by the print module, said feed tray is inclined in two directions so that the mail items disposed on said tray are brought by gravity against a retractable jogging flap into the same determined position at which said print module affixes a postal imprint.

3 Claims, 1 Drawing Sheet

POSTAGE METER HAVING A VERTICAL PATH

FIELD OF THE INVENTION

The present invention relates exclusively to the field of mail handling and it relates more particularly to a postage meter or "franking machine" that is of simple design and that is inexpensive for use in an office context for franking (i.e. printing postage amounts on) small numbers of mail items.

PRIOR ART

U.S. Pat. Nos. 4,892,162 and 4,893,249 disclose postage meters whose paths along which the mail items are conveyed are inclined so as to reduce the "footprint" of such meters (i.e. the work surface area they occupy) and thus to facilitate use of them in an office context. Unfortunately those postage meters are still relatively complex with various motor drives and elaborate synchronization control means.

OBJECT AND DEFINITION OF THE INVENTION

An object of the present invention is to provide a postage meter whose components, except for the print head, are reduced to the bare minimum. An object of the invention is to propose a postage meter that is of low cost and of small size, enabling a few tens of mail items to be franked per day. Another object of the invention is to propose a postage meter without a motor drive for conveying the mail items.

These objects are achieved with a postage meter including a print module for printing on mail items, and a feed tray for feeding in mail items to said print module, wherein said feed tray is inclined in two directions so that the mail items disposed on said tray are brought by gravity against a retractable jogging flap into the same determined position at which said print module affixes a postal imprint.

Thus, the feed tray being inclined in two directions makes it possible to omit drive means for driving the mail items and to direct said mail items towards a single print position. The resulting postage meter is particularly simple and robust because it is free of any moving part.

Advantageously, said tray is inclined at an angle lying in the range 60° to 90° in a first direction (X) and at an angle lying in the range 60° to 90° in a second direction (Y).

Preferably, the retractable jogging flap is mounted to move and retracts after the postal imprint has been printed so as to enable the mail item to fall automatically under the effect of gravity into a collection tray for collecting the mail items.

In a preferred embodiment, said feed tray for feeding in mail items incorporates a weighing module delivering the value of the weight of the mail item laid on said feed tray and that is to be franked.

BRIEF DESCRIPTION OF THE DRAWINGS

The characteristics and advantages of the present invention appear more clearly from the following description given by way of non-limiting indication and with reference to the accompanying drawing, in which.

DETAILED DESCRIPTION OF A PREFERRED EMBODIMENT

Figure 1:
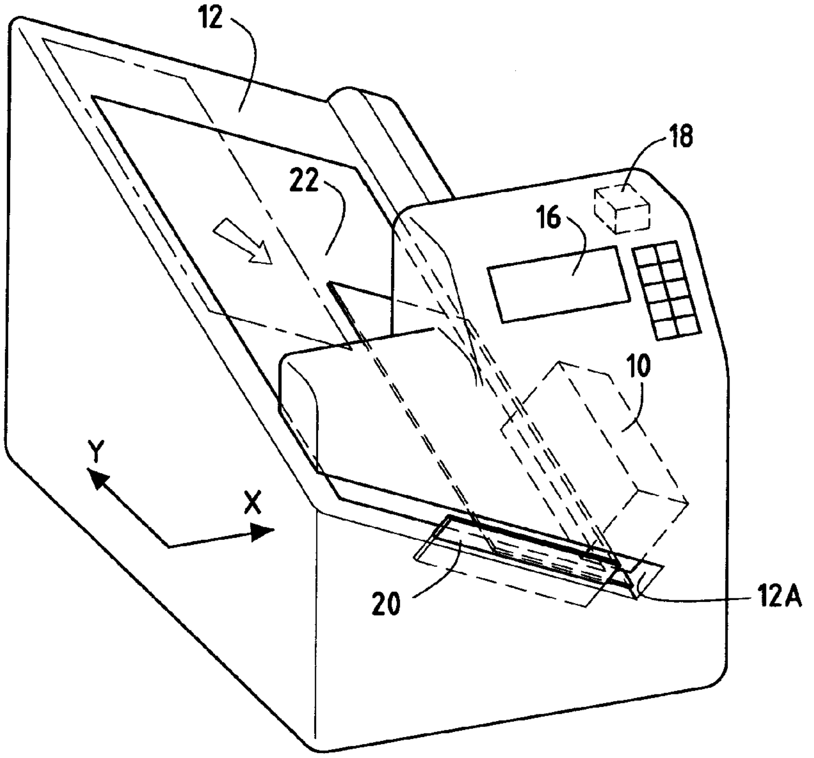
FIGS. 1 and 2 are perspective views showing the postage meter of the invention before and after a franking operation.
Figure 2:
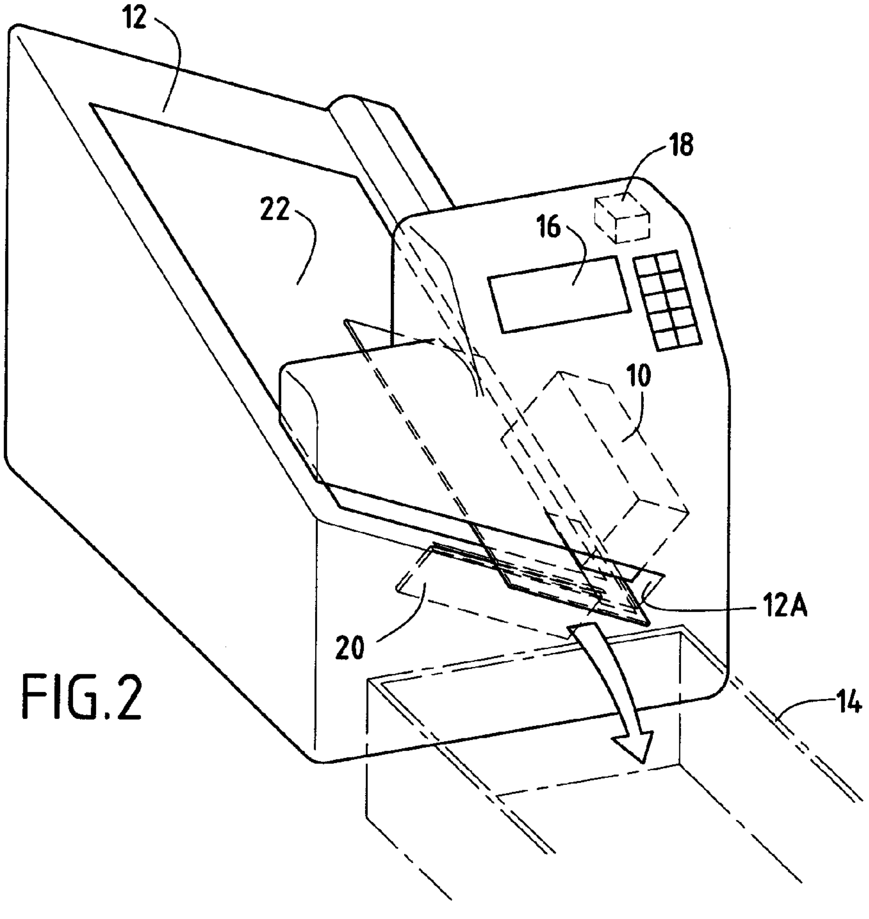

FIGS. 1 and 2 are perspective views of a postage meter of the invention for franking mail items. Each mail item, be it an envelope or a label, bears at least one printed postal imprint, as is customary, in the top right corner of the mail item. Conventionally, such a postage meter includes print module 10 for printing the mail item, which means typically comprise an ink jet print head, a feed tray or plate 12 for feeding mail items into said print module, and a collection tray 14 for receiving the mail items once they have been franked by the print module. Naturally, the postage meter has a user interface 16 for inputting and displaying the amount of the postage or of the "franking", or, if that amount is determined automatically, for inputting and displaying the postal data necessary for determining said amount (class of weight, geographical zone of destination, services requested, etc.), and said postage meter also has secure processing means 18 containing inter alia accounting data for keeping account of the postage amounts, by means of up-counters and down-counters in particular, and the monetary recharge data. Said postage meter can also include connection means for connecting to a remote server system that then makes said postage meter act as a communicating machine for recharging with monetary units and for sending statistics.

The feed tray can incorporate a weighing module 22 delivering the weight of the mail item that is placed on the tray and that is to be franked. Thus, with this variant embodiment, the user merely has to input the geographic code for the destination of the mail item, and optionally the requested service in order for the amount of the franking of the mail item to be determined automatically and in order for the printing to be launched once the weight calculation is completed.

In prior art postage meters, synchronized motor drive means are provided for conveying the mail items through the meter from the feed tray to the collection tray via the print module. Conversely, with the present invention which is based on the use of gravity (gravitational effect) for moving the mail item from the feed tray to a print position and then for ejecting the mail item as printed to the collection tray, it is no longer necessary to use such motor drive means that are usually essential when the path along which the mail items are conveyed is horizontal. This results in a postage meter that is of simpler design and of greater reliability due to the absence of such moving mechanical parts and of complex means for controlling synchronization thereof.

In addition, the use of gravity, which implies a large angle of inclination (typically in the range 60° to 90°) of the path along which the mail items are conveyed results in significantly reducing the size of the footprint of the postage meter and thus in facilitating use of it in an office environment.

In order to guarantee excellent positioning of the mail item facing the print module, the feed tray 12 is not inclined in one direction only but rather it is inclined in two directions so that, after its fall, the envelope or the label finds itself in abutment against a longitudinal reference wall 12A and a against a retractable jogging flap 20, always in the same position regardless of its initial position on the feed tray (it naturally being understood that the mail item has a predefined orientation). In this position, said mail item is franked by the stationary print module 10 and then, once printing is complete, the flap 20 being retracted automatically causes said mail item to fall by gravity into the collection tray 14 as shown in FIG. 2.

The postage meter of the present invention is particularly suitable for franking mail items in small numbers (at the most a few tens per day) and, by means of its simplified and robust structure, it can be implemented in various environments, not only office environments but also industrial or commercial environments.

What is claimed is:

1. A postage meter comprising:

a print module for printing on mail items, said print module being disposed in a fixed position; and a feed tray for feeding in mail items to said print module, wherein said feed tray is inclined at an angle lying in the range 60° to 90° in a first direction and at an angle lying in the range 60° to 90° in a second direction, so that the mail items disposed on said tray are brought by gravity against a retractable jogging flap into the same determined position at which said print module affixes a postal imprint.

2. A postage meter according to claim 1, wherein said retractable jogging flap is mounted to move and retracts after the postal imprint has been printed so as to enable the mail item to fall automatically under the effect of gravity into a collection tray for collecting the mail items.

3. A postage meter according to claim 1, wherein said feed tray for feeding in mail items incorporates a weighing module delivering the value of the weight of the mail item laid on said feed tray and that is to be franked.

* * * * *